United States Patent [19]

Okachi

[11] Patent Number: 4,751,447
[45] Date of Patent: Jun. 14, 1988

[54] AC MOTOR SPEED CONTROL APPARATUS

[75] Inventor: Hiroaki Okachi, Aichi, Japan

[73] Assignee: Mitsubishi Denki Kabushiki Kaisha, Tokyo, Japan

[21] Appl. No.: 924,877

[22] Filed: Oct. 30, 1986

[30] Foreign Application Priority Data

Oct. 31, 1985 [JP] Japan ................... 60-244614

[51] Int. Cl.$^4$ .......................... H02P 1/26; H02P 1/42; H02P 3/18; H02P 5/28
[52] U.S. Cl. .................................. 318/772; 318/768; 318/779; 318/800; 363/79; 363/80; 363/97; 363/160
[58] Field of Search ............... 318/768, 772, 779, 799, 318/800, 801, 803, 807, 808, 809, 810, 811, 826, 827, 333, 339, 344, 345 B; 363/79, 80, 97

[56] References Cited

U.S. PATENT DOCUMENTS 4,555,755 11/1985 Kurosawa et al. ................. 318/803

Primary Examiner—William M. Shoop, Jr.
Assistant Examiner—Brian K. Young
Attorney, Agent, or Firm—Bernard, Rothwell & Brown

[57] ABSTRACT

The present invention discloses a speed control apparatus for an AC motor which vector-controls, for example, a drive current of the AC motor such as an induction motor, synchronous motor and AC commutator motor with a feedback current control loop providing an inverter utilizing a semiconductor element for power amplification such as power transistor and compensates for non-linear current characteristic of the drive current generated by dead time resulting from ignition delay of a semiconductor element with a current compensation control element provided within the current control loop, thereby controlling the rotation speed and command response speed of an AC motor.

3 Claims, 4 Drawing Sheets

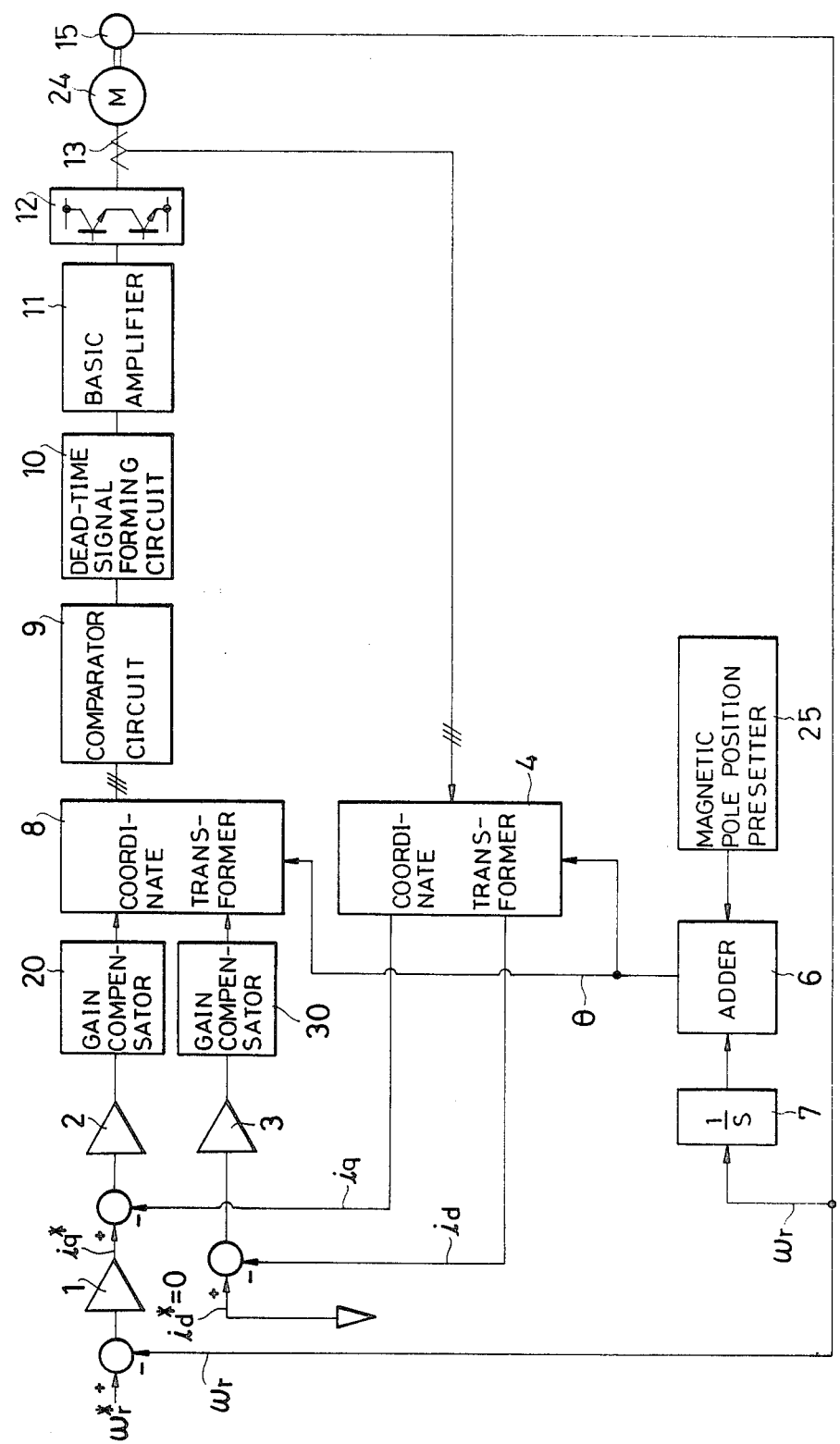

AC MOTOR SPEED CONTROL APPARATUS

BACKGROUND OF THE INVENTION

1. Field of the Invention

The present invention relates to a speed control apparatus which controls speed such as rotating speed and response speed of an AC (alternating current) motor, for example, of an induction motor, synchronous motor and AC commutator motor, etc.

2. Description of the Prior Art

In various industrial fields, motors of various scales and kinds are used in general and these motors can be broadly divided into DC (direct current) motors and AC motors. Of these various kinds of motors, the DC motors are very excellent in the controllability assuring high reliability of operation but inferior in applicability due to complicated structure and high manufacturing cost. Therefore, the AC motor is frequently used in many industrial fields. AC motors are classified, for example, induction motors, synchronous motors and AC commutator motors, etc.

The speed control of an AC motor has been conducted with a speed control apparatus as indicated in the block connection diagram of FIG. 1. As shown in FIG. 1, this speed control apparatus is composed of a speed compensator 1, current compensators 2 and 3, a first coordinate transformer 4 which transforms an input current detected of an AC motor into magnetic flux and torque as described later, a slip frequency calculator 5 which calculates a slip frequency of torque current, an adder 6 which calculates the addition of the calculated value of this slip frequency and the detected speed value of the AC motor, an integrator 7 which integrates outputs of the adder 6, a second coordinate transformer 8 which transforms outputs of the current compensators 2, 3 to a 3-phase AC voltage command, a comparator circuit 9 which receives the output of the second coordinate transformer 8 as an output, a dead-time signal forming circuit which delays timing of an output of the comparator circuit 9 for a certain period, a basic amplifier 11 which insulates outputs of such dead-time signal forming circuit 10 and amplifies them, an inverter 12 utilizing a semiconductor element for amplifying power such as a power a transistor a which is responsive to the output of base amplifier 11 and controls a drive current of the AC motor in vector, a current detector 13 which detects an AC motor drive current to be input to the first coordinate transformer, an induction motor 14 as an AC motor to be driven through the vector control, and a speed detector 15 which detects rotating speed of the induction motor 14. In FIG. 1, the speed control apparatus is illustrated, except for the elements such as a compensating means, for example, inverse electromotive force compensating means which is not directly related to explanation of the present invention.

Operations based on above structure are explained hereunder.

As is well known, vector control is intended to attain a high response control by individually controlling the current component for magnetic flux and the current component for torque of the current supplied to the motor. Therefore, a coordinate which rotates in synchronization with the secondary magnetic flux is considered assuming the axis component $i_d$ (current for magnetic flux) which is parallel to the secondary magnetic flux and the axis component $i_q$ (current for torque) which is orthogonal to said secondary magnetic flux as the control object.

In FIG. 1, deviation "$\omega_r^* - \omega_r$" of a speed command $\omega_r^*$ and a speed detection signal $\omega_r$ from the speed detector 15 is amplified by the speed compensator 1 and its output becomes a torque current command $i_q^*$. Meanwhile, a 3-phase AC current detected by the current detector 13 is transformed to a magnetic flux current $i_d$ and a torque current $i_q$ by the first coordinate transformer 4. Therefore, deviation between said torque current command $i_q^*$ and torque current $i_q$ is amplified by the current compensator 2 and becomes a q-axis voltage command $v_q^*$. It is then input to the second coordinate transformer 8. In the same way, a magnetic flux current command $i_d^*$ is set in accordance with the characteristic of load motor and deviation between the magnetic flux current command $i_d^*$ and magnetic flux current $i_d$ is amplified by the current compensator 3 and becomes a d-axis voltage command $v_d^*$. The q-axis voltage command $v_q^*$ and the d-axis voltage command $v_d^*$ are then input to the second coordinate transformer 8. In the second coordinate transformer 8, the d-axis voltage command $v_d^*$ and the q-axis voltage command $v_q^*$ are converted to the 3-phase AC voltage commands $v_u^*$, $v_v^*$, $v_w^*$ and these are input to the comparator circuit 9. These are compared therein with a triangle wave signal and thereby the ON-OFF signal of the transistors forming a transistor inverter 12 is generated. However, since a certain time delay is generated during transfer between ON and OFF states of the transistors, the ON timing is delayed for a constant period $T_d$ so that a pair of transistors connected in series between the DC buses are not turned ON simultaneously in the transistor inverter 12. The dead-time signal forming circuit 10 is provided for this purpose. An output of this circuit is amplified and insulated by the basic amplifier 11 as an actual drive signal for the transistor inverter.

Moreover, a slip frequency $\omega_s$ must be controlled by the well known method utilizing the following equation in order to synchronously rotate the control coordinate axis with the secondary magnetic flux.

$$\omega_s = (R_2 i_q)/(L_2 i_d)$$

Where, $R_2$ is a secondary resistance, $L_2$ is a secondary inductance, respectively.

The slip frequency calculator 5 calculates a slip frequency $\omega_s$ using above equation. The slip frequency $\omega_s$ output from this calculator 5 and the speed detection signal $\omega_r$ detected by said speed detector 15 are added in the adder 6. A position data $\theta$ of secondary magnetic flux can be obtained by integrating such added output in the integrator 7 and this position data $\theta$ is output to the first coordinate transformer 4 and the second coordinate transformer 8, thus completing the coordinate transformation.

With the structure and operations described above, a drive current is transformed into a magnetic flux current and a torque current and is controlled as a DC component according to the speed control apparatus of the AC motor of the prior art. Therefore, rotating speed control of AC motor can be realized easily and digital control utilizing a microprocessor, etc. can also be realized easily. In this point, this apparatus can be said to be a very effective control apparatus.

However, the existing speed control apparatus for an AC motor has the following problems.

The input side of transistor inverter 12 is provided with the dead-time signal forming circuit 10 in order to prevent a pair of transistors connected in series from being turned ON simultaneously. This dead time makes non-linear $i_d/v_d^*$, $i_q/v_q^*$ and generates an offset as shown in FIG. 3 and as explained later. The current compensators 2 and 3 carry out the proportional and integral compensation (PI compensation) and influence of the non-linear characteristic has been controlled to a minimum condition by raising a proportional gain. However excessively higher gain makes the margin of stability of the control system small. Particularly, when the sampling control is carried out using a microcomputer, the allowable upper limit of gain is lowered by other restrictions and therefore compensation is insufficient and there arises a problem in the region where a voltage amplitude is so low that a loop gain of the current control system is equivalently lowered, response of current control system is also lowered and as a result sufficient speed response cannot be obtained.

SUMMARY OF THE INVENTION

It is an object of the present invention to provide a speed control apparatus which improves the speed response of an AC motor by improvement in the response speed of a current control system.

In order to attain above object, the speed control apparatus for an AC motor in which the present invention is incorporated adds a non-linear gain compensation control means, which gain-compensates the non-linear characteristic generated in the current control system resulting from a dead time of an inverter using a power semiconductor element for vector control, to the current control system.

The gain compensation control means of the present invention works to deny the non-linear characteristic generated by the dead-time of a semiconductor element for power amplification such as a power transistor and thereby linearizes current control and realizes uniformly high current response width without influence on input amplitude.

BRIEF DESCRIPTION OF THE DRAWINGS

FIG. 5 is a block connection diagram illustrating the vector control of the speed control apparatus for an AC motor by other embodiment of the present invention.

DETAILED DESCRIPTION OF THE PREFERRED EMBODIMENTS

Some suitable embodiments of the speed control apparatus for an AC motor in which the present invention is incorporated are explained in detail with reference to the attached drawings.

Figure 1:
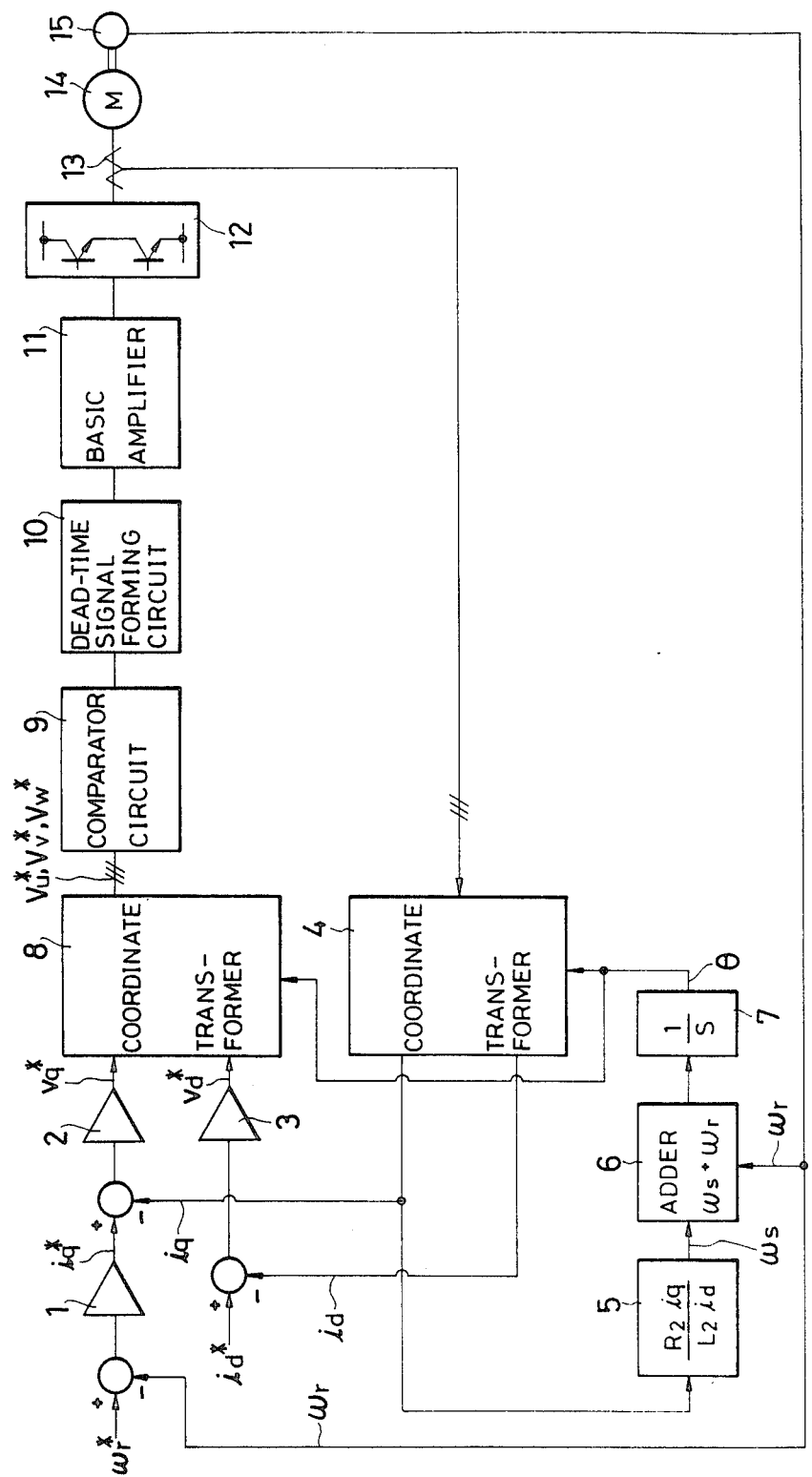
FIG. 1 is a block connection diagram illustrating vector control of a speed control apparatus for an existing AC motor.
Figure 2:
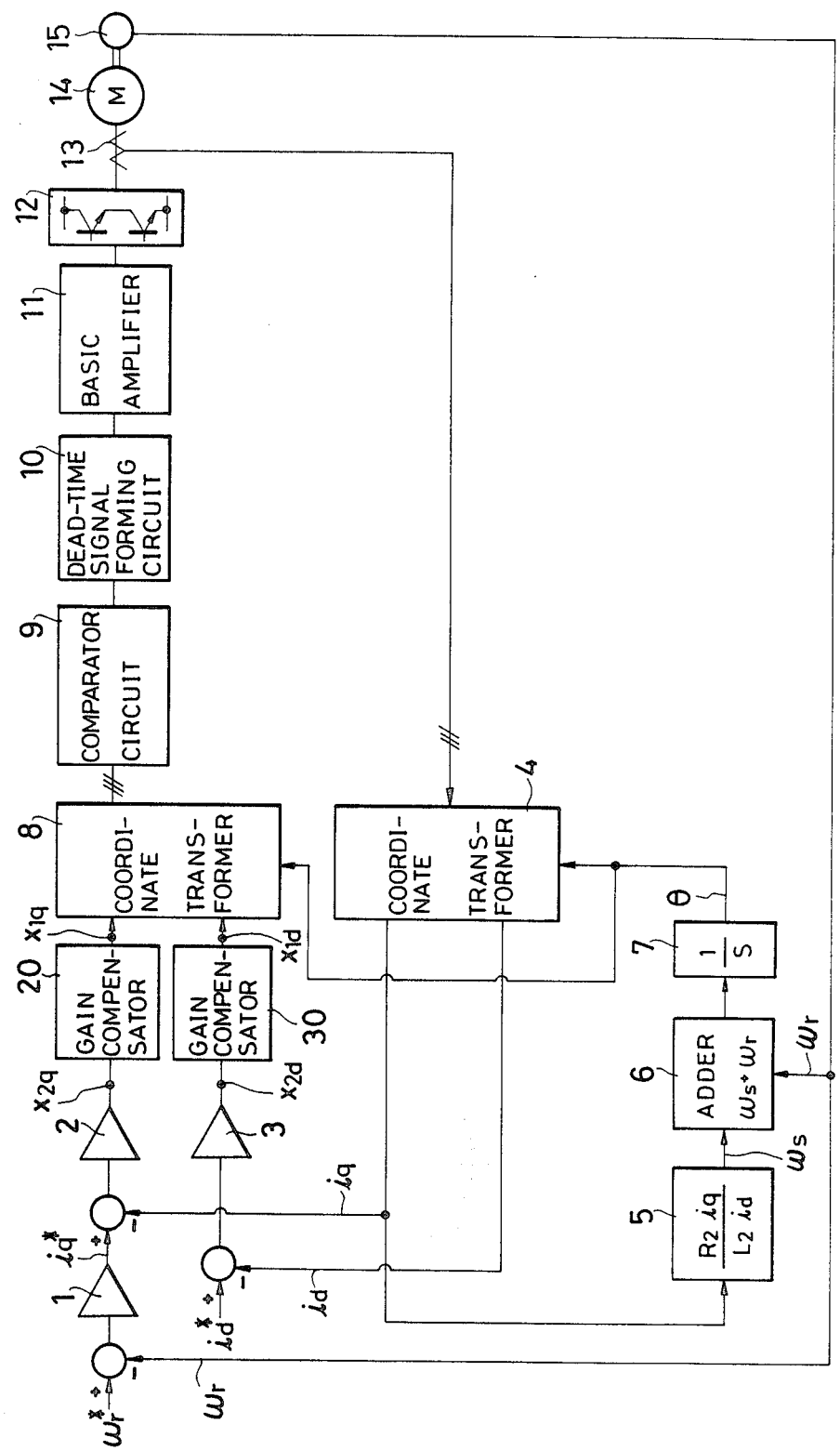
FIG. 2 is a block connection diagram illustrating vector control of a speed control apparatus for an AC motor in an embodiment of the present invention.

FIG. 2 is a block connection diagram illustrating an embodiment of the present invention. Parts given reference numbers corresponding to those in FIG. 1 illustrating the speed control apparatus of prior art indicate like or corresponding elements and explanation is not duplicated.

In FIG. 2, the gain compensation control means 20, 30 newly added in the present invention are respectively provided between the current compensators 2, 3 which output drive currents for an induction motor 14 used as an AC motor and the second coordinate transformer 8 which transforms outputs of these current compensators 2, 3 into the 3-phase AC voltage commands.

Operations based on such structure are explained hereunder.

Figure 3:
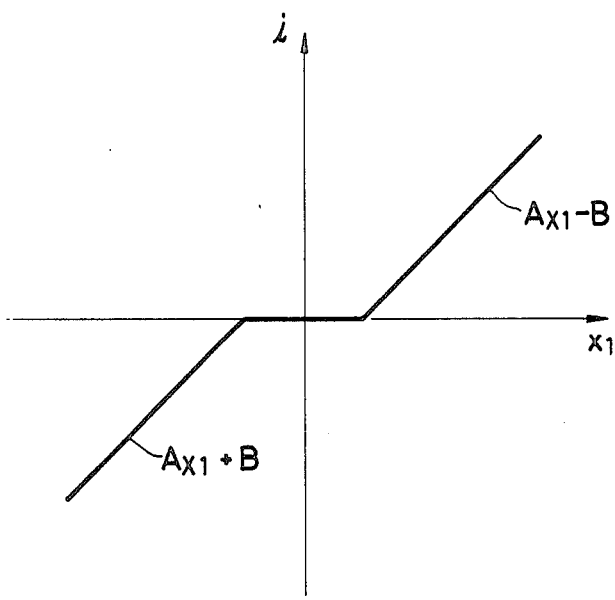
FIG. 3 is a characteristic diagram showing the current/voltage characteristic in the speed control apparatus of FIG. 1.

In FIG. 2, the input/output characteristics of a torque current iq at the connecting point $x_{1q}$ between the gain compensation control means 20 and the second coordinate transformer 8 and a magnetic flux current id at the connecting point $x_{1d}$ between the gain compensation control means 30 and said second coordinate transformer 8 become linear as shown in FIG. 3 and these can be indicated by the following equations.

$$i = A_{x1} - B(x_1 \geq B/A)$$

$$i = A_{x1} + B(x_1 < -B/A)$$

Here, value of A depends on the primary winding resistance of the induction motor 14 used as a load and a value B/A depends on a dead time $T_d$ for preventing short-circuit of upper and lower transistors of a semiconductor element inverter 12 for power amplification.

Figure 4:
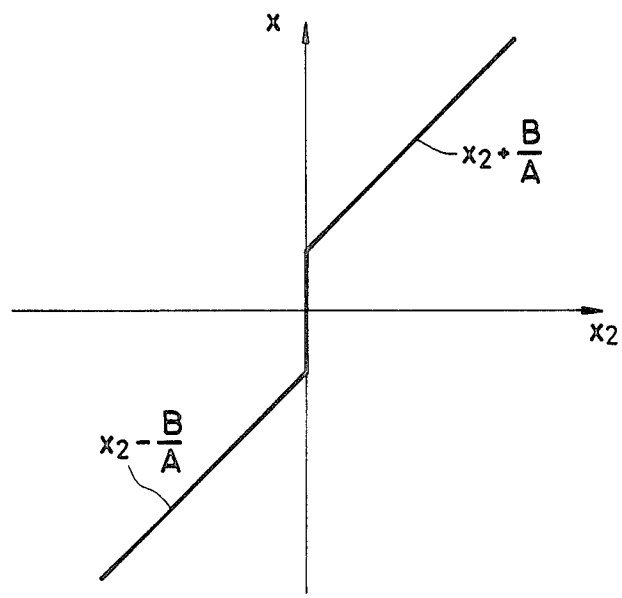
FIG. 4 is a characteristic showing compensation characteristic of the gain compensation control means added to the speed control apparatus of FIG. 1.

Therefore, compensation control is carried out by giving the linear compensation characteristic as shown in FIG. 4 to the gain compensation control means 20, 30. This linear characteristic can be indicated as follow.

$$x_1 = x_2 + B/A(x_2 \geq 0)$$

$$x_1 = x_2 - B/A(x_2 < 0)$$

Namely, the current characteristics of the torque current iq at the connecting point $x_{2q}$ between the current compensator 2 and the gain compensation control means 20 and the magnetic flux current id at the connecting point $x_{2d}$ between the current compensator 3 and the gain compensation control means 30 are indicated as "$i = A_{x2}$" and the offset characteristic depending on dead time $T_d$ of inverter can be eliminated. As a result, the response characteristic can be improved and stabilized for the entire operation region.

In above embodiment, the compensation control is carried out by the hardware structure, but the present invention is not limited only to this structure and for example, a drive current of an AC motor can be controlled by the software processing with a microcomputer and in this case speed control performance can be improved remarkably.

Moreover, in the above explanation, speed control is carried out for the induction motor 14, but the present invention is also not limited only to such induction motors and can also be adapted to a speed control apparatus which controls the speed of a synchronous motor 24 as shown in FIG. 5. In this case, the speed detection signal $\omega_r$ detected by the speed detector 15 of synchronous motor 24 is integrated by the integrator 7, output of this integrator 7 and output of a magnetic pole position presetter 25 are added in the adder 6 and output of this adder is output to the first coordinate transformer 4 and the second coordinate transformer 8 as the position data θ of the secondary magnetic flux, thus completing the coordinate transformation.

As explained above in detail, the speed control apparatus for an AC motor of the present invention provides a gain compensation control means which compensates for the control offset resulting from the dead-time of an inverter using a semiconductor element for power amplification and denies non-linear characteristic based on such dead time by such gain compensation control means and thereby provides the effect that a speed control apparatus for an AC motor having excellent stability, reliability and control performance can be obtained without increase of manufacturing cost.

What is claimed is:

1. A speed control apparatus for an AC motor comprising,
    a feedback current control loop which vector-controls a drive current of an AC motor with an inverter using a semiconductor element for power amplification of the current control type; and
    a compensation control means which is provided within said current control loop and a compensates for non-linear current characteristics generated by dead-time resulting from ignition delay of said semiconductor element;
    said feedback current control loop being composed of a current detection means which detects a drive current of said AC motor, a first coordinate transform which transforms an AC current detected by such current detection means into a magnetic flux current and a torque current, a second coordinate transformer which is responsive to deviation between said magnetic flux current and a magnetic flux command and deviation between said torque current and a torque current command and outputs a 3-phase AC voltage command, and a dead-time signal forming means which generates ignition delay to a semiconductor element forming said inverter;
    said compensation control means comprising gain compensation circuits which are provided at the input side of said second coordinate transformer at the position where a deviation of said magnetic flux current and magnetic flux current command is input and at the position where a deviation of said torque current and torque current command is input and compensate for non-linear characteristic of deviation output of said currents.

2. A speed control apparatus for an AC motor comprising,
    a feedback current control loop which vector-controls a drive current of an AC motor with an inverter using a semiconductor element for power amplification of the current control type; and
    a compensation control means which is provided within said current control loop and compensates for non-linear current characteristic generated by dead-time resulting from ignition delay of said semiconductor element;
    said feedback current control loop being composed of a current detection means which detects a drive current of said AC motor, a first coordinate transformer which transforms an AC current detected by such current detection means into a magnetic flux current and a torque current a second coordinate transformer which is responsive to deviation between said magnetic flux current and a magnetic flux current command and deviation between said torque current and a torque current command and outputs a 3-phase AC voltage command, and a dead-time signal forming means which generates ignition delay to a semiconductor element forming said inverter;
    said AC motor being an induction motor and being controlled by a second feedback control loop which adds a slip frequency calculated by a slip frequency calculation means depending on a torque current output from said first coordinate transformer and a speed detection signal detected by a speed detection means provided to said induction motor, integrates such added outputs with an integration means and outputs the integrated signal to said first and second coordinate transformers.

3. A speed control apparatus for an AC motor comprising,
    a feedback current control loop which vector-controls a drive current of an AC motor with an inverter using a semiconductor element for power amplification of the current control type; and
    a compensation control means which is provided within said current control loop and compensates for non-linear current characteristic generated by dead-time resulting from ignition delay of said semiconductor element;
    said feedback current control loop being composed of a current detection means which detects a drive current of said AC motor, a first coordinate transformer which transforms an AC current detected by such current detection means into a magnetic flux current and a torque current, a second coordinate transformer which is responsive to deviation between said magnetic flux current and a magnetic flux current command and deviation between said torque current and a torque current command and outputs a 3-phase AC voltage command, and a dead-time signal forming means which generates ignition delay to a semiconductor element forming said inverter;
    said AC motor being a synchronous motor and being controlled by a second feedback control loop which adds a speed detection signal detected by a speed detection means provided to such synchronous motor and a magnetic pole position preset signal output from a magnetic pole position preset means, and outputs such added output to said first and second coordinate transformers.

* * * * *